United States Patent [19]

Swiden

[11] Patent Number: 4,925,253

[45] Date of Patent: May 15, 1990

[54] METHOD AND ARRANGEMENT OF AUTOMATICALLY ACTUATING A VEHICLE WHEEL BRAKE WITH THE AIM OF PREVENTING THE WHEEL FROM SKIDDING

[76] Inventor: Bror Lennart A. Swiden, Box 38, S-590 61 Vreta Kloster, Sweden

[21] Appl. No.: 235,898

[22] PCT Filed: Feb. 27, 1987

[86] PCT No.: PCT/SE87/00097

§ 371 Date: Aug. 16, 1988

§ 102(e) Date: Aug. 16, 1988

[87] PCT Pub. No.: WO87/05270

PCT Pub. Date: Sep. 11, 1987

[30] Foreign Application Priority Data

Mar. 3, 1986 [SE] Sweden .................................. 8600943

[51] Int. Cl.$^5$ ............................ B60T 8/64; B60T 8/60
[52] U.S. Cl. ..................................... 303/110; 303/103; 364/426.03; 364/426.02
[58] Field of Search ..................... 303/95, 96, 97, 100, 303/103, 105, 110; 188/181 A, 181 C; 180/197; 364/426.02, 426.03

[56] References Cited

U.S. PATENT DOCUMENTS

| Re. 31,383 | 9/1983 | Leiber et al. | 303/110 X |
|---|---|---|---|
| 3,584,921 | 6/1971 | Crawford . | |
| 3,790,227 | 2/1974 | Dozier . | |
| 3,820,855 | 6/1974 | Salotti et al. . | |
| 3,888,550 | 6/1975 | Reinecke et al. | 303/103 |
| 3,917,353 | 11/1975 | Swiden et al. . | |
| 3,958,834 | 5/1976 | Takeuchi et al. . | |
| 4,230,376 | 10/1980 | Brearley et al. . | |
| 4,327,948 | 5/1982 | Beck et al. | 303/110 X |
| 4,430,714 | 2/1984 | Matsuda et al. | 303/95 X |
| 4,480,309 | 10/1984 | Burckhardt et al. | 364/426.03 |
| 4,484,280 | 11/1984 | Brugger et al. | 364/426.03 |
| 4,635,031 | 1/1987 | Blomberg et al. | 180/197 X |
| 4,681,374 | 7/1987 | Nakomara et al. | 180/197 X |

Primary Examiner—Andres Kashnikow
Assistant Examiner—Timothy Newholm
Attorney, Agent, or Firm—Albert L. Jeffers; John F. Hoffman; David L. Ahlersmeyer

[57] ABSTRACT

An automatic method for preventing wheel skidding during braking and acceleration is disclosed, in which an instantaneous rotational wheel speed is sensed and an instantaneous absolute speed variation is calculated therefrom. During braking, the brake is released automatically when rotational speed either reduces so that speed variation is greater than a predetermined maximum permissible value, or when rotational speed approaches zero with the vehicle still moving. The brake is applied during braking when rotational speed increases to a predetermined time-varying value after brake release. During acceleration, the brake is applied when rotational speed increases so that speed variation is greater than the aforementioned maximum permissible value, and is released when rotational speed falls to a predetermined time-varying value after the brake application. The brake remains unaffected when speed variation is less than the maximum permissible value. The brake is also applied on braking (or released on acceleration) once a predetermined period elapses after the brake is released (applied), which period is a percentage time increment added to the period between a previous release and application (applicationa and release) of the brake.

13 Claims, 4 Drawing Sheets

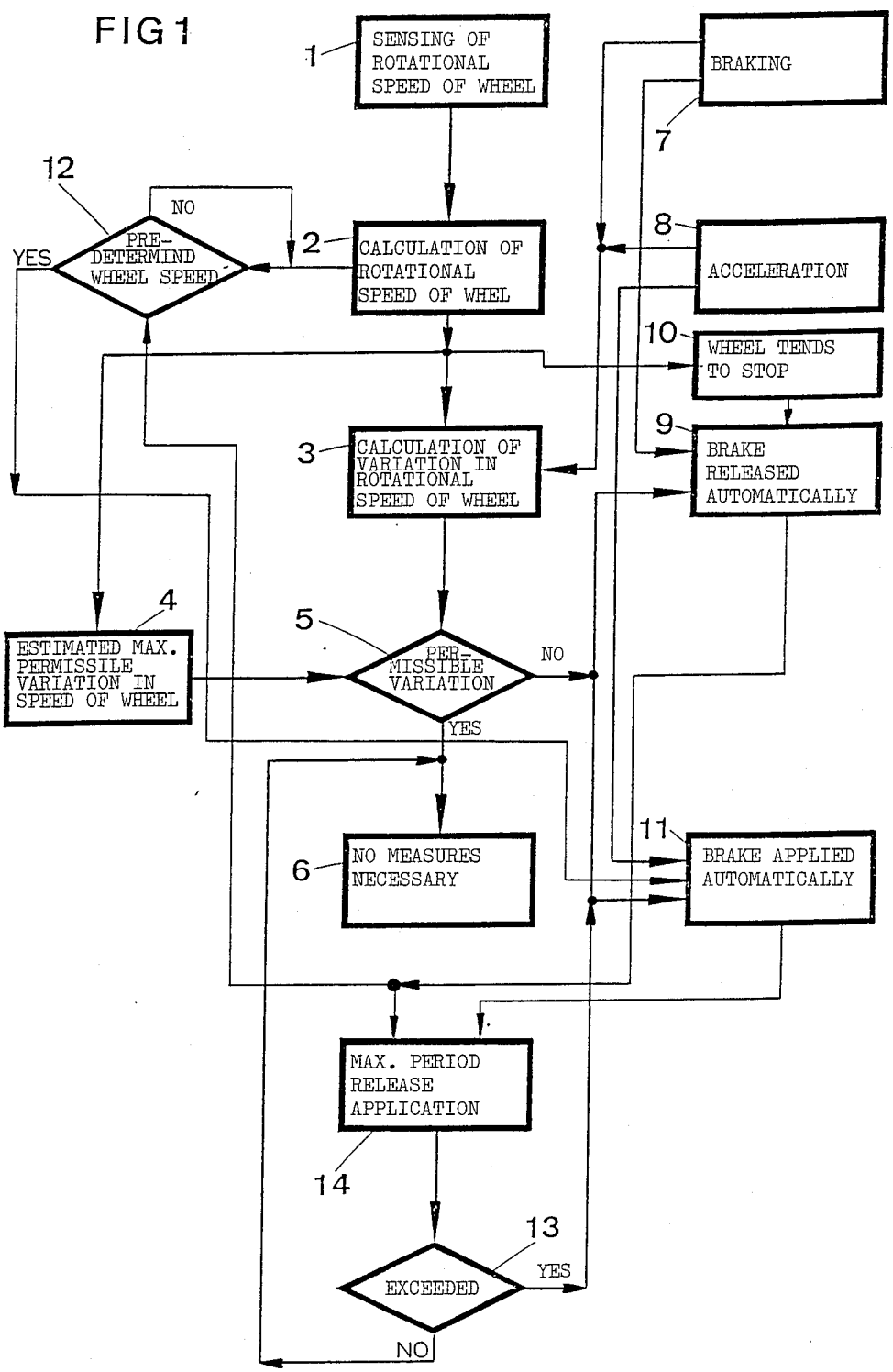

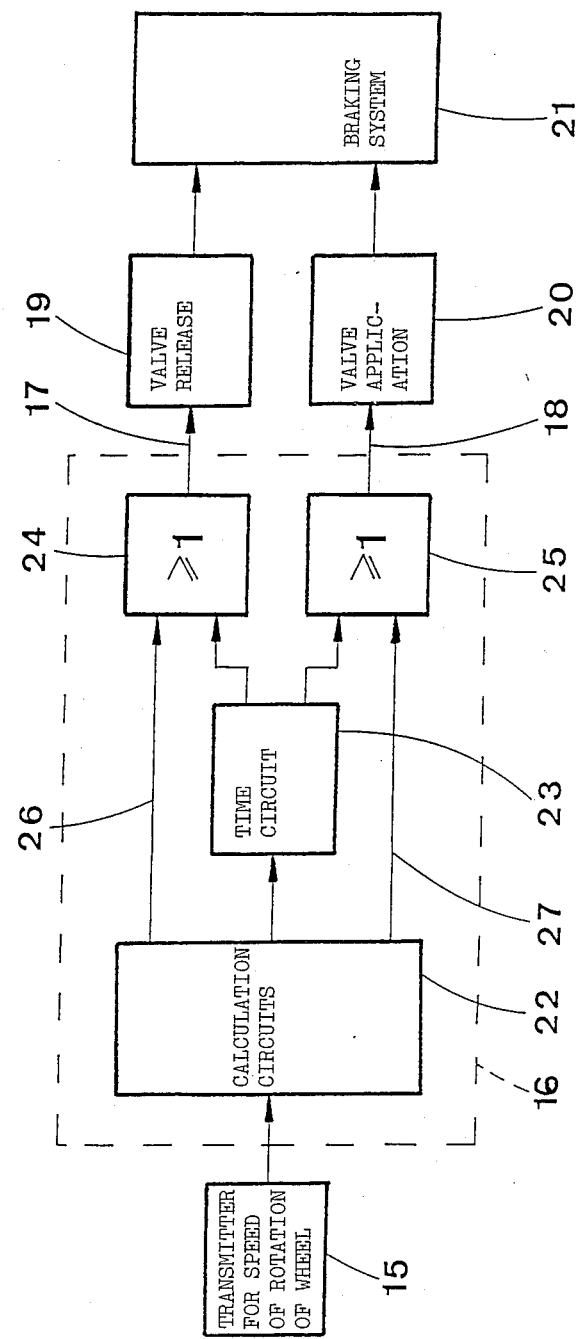

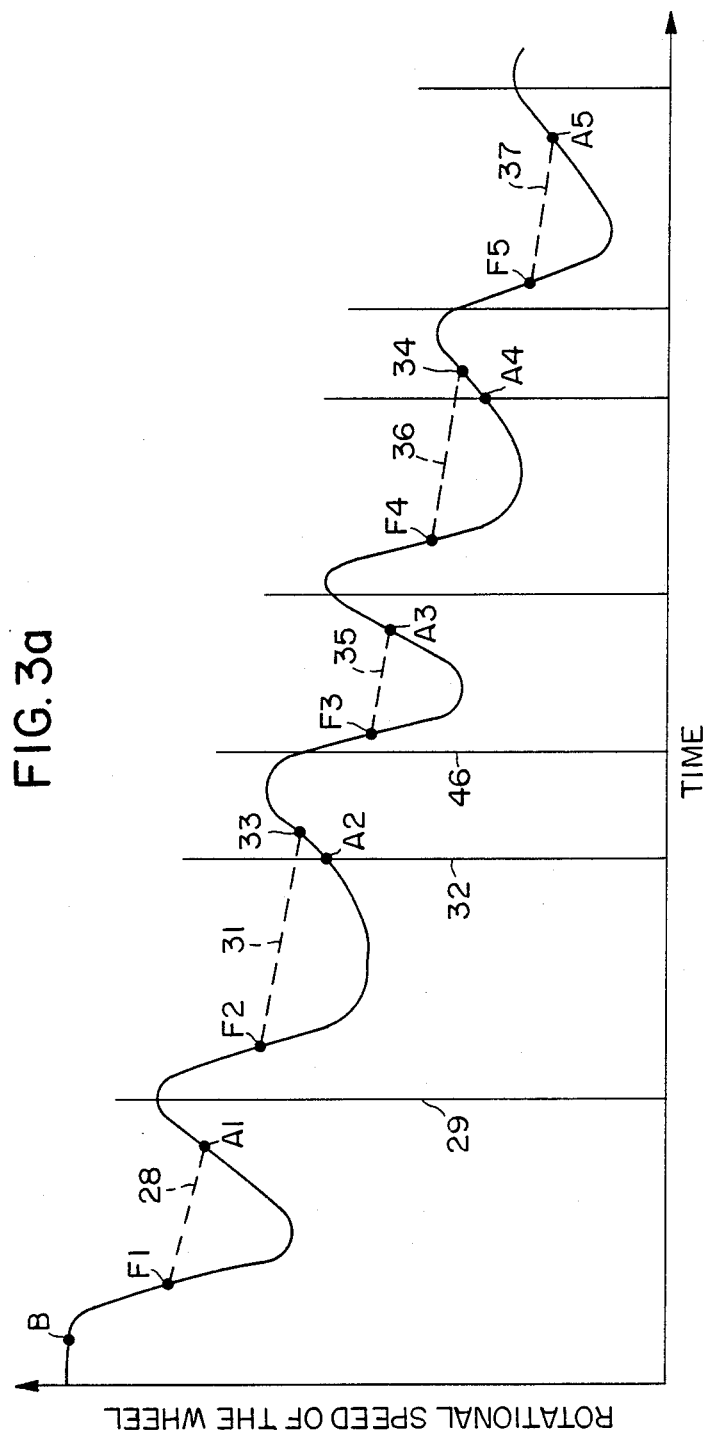

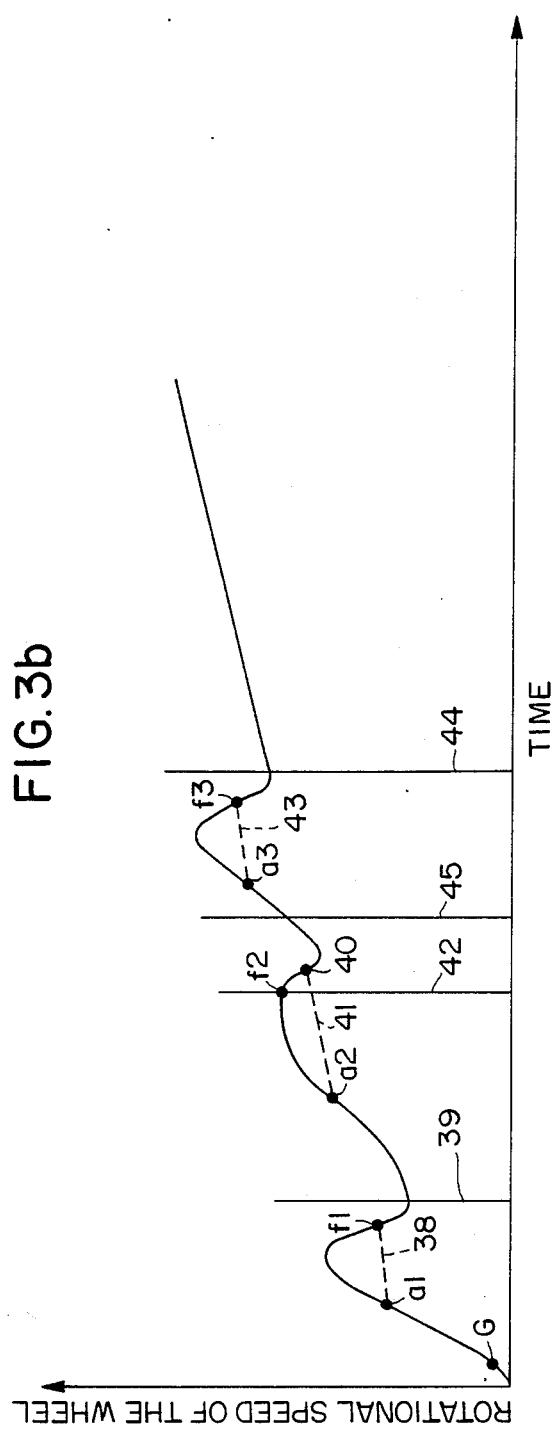

METHOD AND ARRANGEMENT OF AUTOMATICALLY ACTUATING A VEHICLE WHEEL BRAKE WITH THE AIM OF PREVENTING THE WHEEL FROM SKIDDING

BACKGROUND OF THE INVENTION

The present invention relates generally to a method and corresponding apparatus for automatically actuating a vehicle wheel brake with the aim of preventing the wheel from skidding in conjunction with braking and acceleration. More specifically, the present invention relates to such a method wherein the instantaneous speed of rotation of the wheel is sensed and the instantaneous absolute speed variation is calculated, after which the wheel brake is automatically released or actuated depending upon the sensed conditions.

According to the aforementioned brake actuation method, the wheel brake is automatically released during braking of the vehicle when the speed of rotation of the wheel reduces so that its absolute speed variation is greater than a predetermined maximum permissible value. The wheel brake is also automatically released during braking when the speed of rotation of the wheel approaches zero and the vehicle is still in motion. The wheel brake is applied automatically during vehicle braking when the speed of rotation of the wheel has increased to a predetermined reducing value after the brake has previously been released.

During vehicle acceleration, the wheel brake is applied automatically when the speed of rotation of the wheel increases so that its absolute speed variation is greater than the aforementioned predetermined maximum permissible value. The wheel brake is released automatically during acceleration of the vehicle when the speed of rotation of the wheel has fallen to a predetermined increasing value after the brake has been applied.

The wheel brake of the aforementioned brake actuation method remains unaffected and is not subject to automatic actuation when the absolute variation in the speed of rotation of the wheel is less than the aforementioned predetermined maximum permissible value. Also, the wheel brake is applied on braking once a predetermined period has elapsed since the brake was released, and is released on acceleration once a predetermined period has elapsed since the brake was applied.

U.S. Pat. No. 3,917,353 contains an exhaustive description of the above-mentioned method and a system which operates in accordance therewith, including discussion of the difficulties which are associated with braking. A system which proposes to resolve similar problems during both braking and acceleration is described in U.S. Pat. No. 3,584,921.

U.S. Pat. No. 3,958,834 discloses the re-application of a brake during braking once a predetermined period has elapsed since the brake was released automatically, without the unbraked wheel having previously reached an acceleration threshold.

While the above-mentioned system operates satisfactorily when the friction between the road surface and the wheel remains substantially constant, i.e., the road surface is either slippery or coarse, it has been found that the required braking distance for such a system becomes unnecessarily long under variable road conditions, due to an inability of the system to take account of and provide effective braking under such variable conditions.

SUMMARY OF THE INVENTION

The object of the present invention is to make available a method of preventing the wheel of the vehicle from skidding during both braking and acceleration.

The present invention provides an improved brake actuation method and apparatus, wherein the aforementioned period for automatic brake application reckoned from an automatic release during braking is calculated as a percentage increment of time to be added to the period between a previous release and application of the brake during braking. Likewise, the aforementioned period for automatic brake release reckoned from an automatic application during acceleration is calculated as a percentage increment of time to be added to the period between a previous application and release of the brake during acceleration.

BRIEF DESCRIPTION OF THE DRAWINGS

The invention is described below in more detail with reference to the accompanying drawing, in which:

FIG. 1 is a flow chart illustrating the method in accordance with the invention;

FIG. 2 is a block diagram which illustrates in schematic form the construction of an arrangement in accordance with the invention; and FIGS. 3a and 3b illustrate the rotational speed of the wheel for variable road surfaces as a function of time when braking and accelerating.

DESCRIPTION OF THE PREFERRED EMBODIMENT

Referring now to the flow chart of FIG. 1, wherein a brake actuation method in accordance with the present invention is set forth, the numerically designated blocks represent various steps of the method, which will now be described in further detail. At a step 1 the rotational speed of the vehicle wheel is sensed, after which the instantaneous speed of rotation of a vehicle wheel is calculated at a step 2. Next at a step 3 the instantaneous absolute variation in the speed of rotation of the wheel is calculated. At a step 4 a maximum permissible absolute variation in the speed of rotation for the instantaneous speed of rotation of the wheel is calculated.

At a step 5 the value for the absolute variation in the speed of rotation calculated at step 3 is compared with the maximum permissible value calculated at step 4, and it is decided whether the instantaneous absolute variation in the speed of rotation exhibits a permissible value (YES) or an impermissible value (NO). Variations in the absolute speed of rotation of the wheel of less than the maximum permissible value do not call for any measures to be taken, as indicated at a step 6. It is clear that an impermissible variation in the absolute speed of rotation can occur only during braking or acceleration, with the result that the wheel will skid or spin. If there is an impermissible variation in the absolute speed of rotation of the wheel, the action taken will depend on whether the impermissible high variation in the absolute speed of rotation occurs during braking or during acceleration. A step 7 indicates a braking condition of the vehicle, whereas, a step 8 indicates an acceleration condition of the vehicle.

During braking, as so indicated at step 7, the wheel brake is released automatically at a step 9 in response to either of two different criteria. First, the brake is released automatically during braking when the variation in the absolute speed of rotation of the wheel is greater than the maximum permissible variation, which is illustrated by alternative NO at step 5. Second, the brake is released automatically during braking when the vehicle is still in motion, but the speed of rotation of the wheel is approaching zero and the wheel will tend to stop rotating, as indicated at a step 10.

During braking, as so indicated at step 7, the wheel brake is applied automatically at a step 11 once it has been established that the speed of rotation of the wheel has increased to a predetermined value after a previous automatic release of the brake. At a step 12, the instantaneous speed of rotation of the wheel is compared with a predetermined value based upon the speed of rotation of the wheel at the time of application of the brake, as derived from step 11, to decide whether the speed of rotation of the wheel has reached the predetermined value (YES) or has not (NO). In the latter case, the comparison of step 12 will continue to be made until a YES indication is achieved.

In accordance with the method of the present invention embodied in the flow chart of FIG. 1, a step 14 is provided at which a period is calculated for the automatic application of the brake following a previous automatic release thereof during braking, or for the automatic release of the brake following a previous automatic application thereof during acceleration. More specifically, a maximum period before the brake is either automatically applied or released is derived as a percentage increment of time to be added to the period between a previous release and application of the brake during braking, or to the period between a previous application and release of the brake during acceleration.

During braking, the brake is applied automatically at step 11 when the maximum period has elapsed since the brake was released automatically at step 9. Specifically, at a step 13, the period which has elapsed since the brake was released is compared with the maximum period, and a decision is made whether the maximum period has elapsed (YES) or has not elapsed (NO). If the period has not elapsed (NO), then the method proceeds to step 6 where no measure is taken. If the maximum period has elapsed (YES), then the brake will be applied automatically.

During acceleration, the brake is applied automatically at step 11 when the estimated speed of rotation of the wheel measured at step 2 increases in such a way that the variation in the absolute speed of rotation of the wheel calculated at step 3 is greater than the maximum permissible variation calculated at step 4. This condition is detected at step 5 and results in a NO decision, thereby indicating that the wheel is spinning, whereby the wheel brake is applied automatically at step 11. The YES alternative at step 5 will result in no measure having to be taken, as indicated at step 6.

During acceleration, the wheel brake is released automatically at step 9 once the speed of rotation of the wheel has fallen to a predetermined value based upon the speed of rotation of the wheel at the time when the brake was applied automatically at step 11. This occurs once the comparison of step 12 results in a YES decision. As previously discussed, the comparison of step 12 will continue to be made until a YES indication is achieved.

The wheel brake is applied automatically at step 11, during braking, once the estimated period calculated at step 14 has elapsed since the brake was previously automatically released. Likewise, the brake is released automatically at step 9, during acceleration, once the estimated period calculated at step 14 has elapsed since the brake was previously automatically applied. Whether or not either of these actions is taken depends on the outcome of the comparison of step 13, which is made under conditions of either vehicle braking or acceleration, as previously described.

A design for an arrangement which operates in the manner described above in conjunction with the flow chart of FIG. 1 is illustrated by way of example in FIG. 2. The designation 15 is used in respect of a block which indicates a transmitter for the speed of rotation of the wheel. Transmitter 15 is preferably a pulse generator arranged on a vehicle wheel, wherein the instantaneous pulse frequency of the pulse generator corresponds to the instantaneous speed of rotation of the wheel. Transmitter 15 is connected to a calculating device 16 having two outputs 17 and 18, which are connected to valves 19 and 20, respectively, for the release and application of the braking system 21 of the wheel. Calculating device 16 contains calculation circuits 22 for calculating the instantaneous absolute variation in the speed of rotation in response to the pulse signals received from transmitter 15. Calculation circuits 22 also control the actuation of valves 19 and 20 for the application and release of the brake 21, depending on the reaction of the wheel to braking and acceleration, as previously described in conjunction with FIG. 1.

In accordance with the disclosed embodiment of the present invention, an output of calculation circuits 22 is connected to a time circuit 23 having two outputs, each of which is connected to a respective one of a pair of "OR" gates 24 and 25. Outputs 26 and 27 from calculation circuits 22 are also respectively connected as inputs to "OR" gates 24 and 25 to effect the release and the application of the braking system 21. Transmitter 15 and calculation circuits 22 operate for this purpose essentially in the manner described in U.S. Pat. No. 3,917,353, previously referred to herein.

Time circuit 23 is adapted to respond to the automatic release and application of the wheel brake 21, as controlled by calculation circuits 22, so as to calculate the period referred to in connection with step 14 of FIG. 1. This period must elapse prior to both automatic application of the brake following a previous automatic release thereof during braking, and automatic release of the brake following a previous automatic application thereof during acceleration.

The method in accordance with the above-described invention, wherein a vehicle wheel brake is actuated during vehicle braking and acceleration with the aim of preventing the wheel from skidding, is now described in more detail with reference to FIGS. 3a and 3b.

BRAKING

It is assumed that a braking condition of the vehicle starts at a point B, which means that the speed of rotation of the wheel falls rapidly. When the variation in the absolute speed of rotation of the wheel becomes greater at a point F1 than the maximum permissible variation in the absolute speed of rotation, the wheel brake is released automatically. The speed of rotation of the wheel will continue to fall, albeit at a reducing rate, until the moment of friction of the road surface first becomes identical with and then becomes greater than the moment of inertia of the mass of the wheel. At that point, the speed of rotation of the wheel will increase once more.

Calculation of a predetermined speed of rotation of the wheel at which the brake will be automatically applied starts in conjunction with the release of the brake at point F1. While this calculation can be performed in various ways, the calculation in accordance with a preferred embodiment of the invention is made in such a way that the starting point is the value of the speed of rotation of the wheel at point F1, which value is reduced by a certain amount per unit of time. The reducing value for the speed of rotation of the wheel is illustrated by means of a sloping line 28. At point A1, where line 28 intersects the curve for the speed of rotation of the wheel, the speed of rotation of the wheel will have increased to the predetermined value since the previous release of the brake, and the brake will accordingly be applied automatically.

It is important to note that the period between points F1 and A1 serves as a measure of the nature of the road surface against which the wheel is braked. This period, plus a percentage increment, is used as a measure of the predetermined maximum period calculated at step 14 of FIG. 1 and produced by means of the time circuit 23 in FIG. 2. In accordance with the invention, the brake is automatically applied after this maximum period has elapsed if it has not previously been applied as a result of the speed of rotation of the wheel increasing to the reducing predetermined value represented by line 28. The aforementioned maximum period is illustrated in FIG. 3a as the distance between point F1 and a vertical line 29. This period is stored for possible future use, as required, beginning at a point F2.

Once the brake has been applied at point A1, the speed of rotation of the wheel first continues to increase, although the speed of rotation decreases gradually before finally becoming a reduction in the speed of rotation. It is now assumed that the road surface has become less coarse than previously. As a result of this, the reduction in the speed of rotation takes place more rapidly than during the previous operation. In other words, the curve for the speed or rotation of the wheel exhibits a slightly steeper path than previously. As previously, when the variation in the speed of rotation of the wheel becomes greater than the maximum permissible variation in the speed of rotation, the brake is released automatically at point F2.

As previously explained in connection with point F1, both the calculation of the predetermined value for the speed of rotation of the wheel which the instantaneous speed of rotation of the wheel is to achieve in order for the brake to be reapplied, and the memorized maximum period following the elapse of which the brake is applied automatically if this has not already taken place as a result of the first criterion, starts at the moment the brake is released at F2. The calculation of the reducing value for the rotational speed of the wheel is based on the speed of rotation of the wheel at point F2, resulting in a line 31 having the same inclination as line 28 and intersecting the curve for the speed of rotation of the wheel at a point of intersection 33.

A vertical line 32 is used to indicate the end of the stored period memorized from point F1, which starts at point F2 and is of the same duration as the period between F1 and the line 29. As a consequence of the reduced coarseness of the road surface, the curve for the speed of rotation of the wheel after point F2 exhibits a flat path. Consequently, the curve first intersects line 32 at a point A2, and then intersects line 31 at the aforementioned point 33. Accordingly, the brake is applied automatically in the manner which is characteristic of the invention, i.e., once a maximum period calculated in accordance with the above has elapsed since the brake was released at the point F2.

The fact that point A2 chronologically precedes the point of intersection 33 means that, when braking on a slippery surface in accordance with the invention, the brake will be applied earlier than is the case when braking in a conventional manner. In the event of an instantaneous variation in the absolute speed of rotation of the wheel exceeding the maximum permissible variation, the brake will be released automatically at point F3. Because point A2 chronologically precedes point 33, the previously memorized maximum period will be eliminated and a new period from point 33 to a line 46 will be calculated and stored in memory as previously.

Further braking is assumed to take place in the manner illustrated by the path of the curve for the speed of rotation of the wheel in FIG. 3a. Specifically, points F3, F4, and F5 indicate times at which the wheel brake is released automatically, and points A3, A4, and A5 similarly indicate times at which the brake is applied automatically. Points A3, A4, and A5 are thus obtained as points of intersection between the curve for the speed of rotation of the wheel and lines 35, 36, and 37, which start at points F3, F4, and F5, respectively, and exhibit the same inclination as lines 28 and 31. The distance between each starting point and finishing point serves as a measure of the nature of the road surface, as described previously. Sections F3–A3 and F5–A5 of the curve exhibit a similar path to that of section F1–A1, and section F4–A4–34 of the curve is comparable to section F2–A2–33.

It will be appreciated from the foregoing that, when braking in accordance with the method to which the invention relates, the wheel brake will be automatically applied earlier following a previous automatic release when driving on a slippery surface than during convention automatic braking. Notwithstanding the foregoing, the wheel brake will be released automatically in a conventional fashion once the variation in the absolute speed of rotation exceeds the maximum permissible variation. Accordingly, the method in accordance with the invention provides optimum adaptation of the braking system to suit the nature of the road surface, thereby providing the shortest possible braking distance.

ACCELERATION

It is assumed that an acceleration condition of the vehicle starts at a point G in FIG. 3b, at which point the wheel begins to turn from rest. The rotational speed of the wheel increases progressively as the vehicle begins to move. If the acceleration is greater than that which corresponds to the coarseness of the road surface, the wheel will lose its grip on the road surface and will begin to spin. Consequently, at a point a1 the instantaneous variation in the absolute speed of rotation of the wheel will increase and become greater than the maximum permissible variation, as a result of which the wheel brake will be applied automatically. In spite of this, the speed of rotation of the wheel will continue to increase initially until the braking moment is greater than the acceleration moment, at which time the speed of rotation of the wheel will decrease.

The instantaneous speed of rotation of the wheel is compared continuously with the predetermined speed of rotation of the wheel at which the brake will be automatically released, which is calculated by a similar method to the corresponding calculation in conjunction with the braking described above. The basis of calculation is the speed of rotation of the wheel at the point a1, to which is added a certain amount per unit of time. This predetermined increasing value for the speed of rotation of the wheel is presented in FIG. 3b by a line 38. The wheel brake is released automatically once the instantaneous speed of rotation of the wheel has reduced to the predetermined increasing value. This occurs at a point f1 at which the line 38 intersects the curve for the speed of rotation of the wheel. Once the wheel brake has been released, its speed of rotation will continue to decrease until the acceleration moment is greater than the moment of inertia of the mass of the wheel.

Similarly to the situation which exists during braking, the period a1-f1 during acceleration in FIG. 3b serves as a measure of the nature of the road surface. This period, plus a percentage increment, serves as a measure of the predetermined maximum period calculated at step 14 of FIG. 1 and produced by means of the time circuit 23 in FIG. 2. According to the invention, the wheel brake is released automatically during acceleration at the end of this maximum period if it has not previously been released as a result of the speed of rotation of the wheel having decreased to the increasing predetermined value represented by line 38. The aforementioned maximum period is illustrated in FIG. 3b as the distance between point a1 and a vertical line 39. This period is stored for possible future use, as required, beginning at a point a2.

Once the brake has been released at point f1, the rotational speed of the wheel continues to decrease, although the decrease in the speed of rotation reduces gradually before finally becoming an increase in the speed of rotation. It is now assumed that the road surface has become coarser than previously. As a result of this, the curve for the speed of rotation of the wheel exhibits a flatter path, i.e., the wheel has found more grip. As previously, when the variation in the absolute speed of rotation of the wheel becomes greater than the maximum permissible variation, the brake will be applied automatically at point a2.

As previously explained in conjunction with point a1, both the calculation of the predetermined value for the speed of rotation of the wheel which the instantaneous speed of rotation of the wheel is to achieve in order for the brake to be released, and the memorized maximum period following the elapse of which the brake is released automatically if this has not already taken place as a result of the first criterion, starts at the moment the brake is applied at point a2. The calculation of the increasing predetermined value for the rotational speed of the wheel is based on the rotational speed at point a2, resulting in a line 41 having the same inclination as line 38 and intersecting the curve for the speed of rotation of the wheel at a point of intersection 40.

A vertical line 42 is used to indicate the end of the stored period memorized from point a1, which starts at point a2 and is of the same duration as the period between a1 and line 39. As a consequence of the increased coarseness of the road surface, the curve for the speed of rotation of the wheel first intersects line 42 at a point f2, and then intersects line 41 at the aforementioned point 40. Accordingly, the brake is released automatically at point f2 in the manner which is characteristic of the invention, i.e., once the memorized maximum period has elapsed since the brake was applied at point a2. Because point f2 precedes point 40, the previously memorized maximum period is eliminated and a new maximum period between point 40 and a line 45 is calculated and stored in memory as before.

Further braking during acceleration is assumed to take place in the manner illustrated by the path of the curve for the rotational speed of the wheel in FIG. 3b. Specifically, points a3 and f3 indicate respective times at which the brake is applied and released automatically. Point f3 represents the point of intersection between the curve for the speed of rotation of the wheel and a line 43 which starts at the point a3 and exhibits the same inclination as lines 38 and 41. The distance between point a3 and a vertical line 44 serves as a measure of the nature of the road surface, as previously described with respect to the period between a1 and line 39.

It is obvious that the invention can be modified in many ways within the scope of the invention. For instance, the calculation of the predetermined reducing or increasing value for the speed of rotation of the wheel at step 12 in FIG. 1, is described as being derived on the basis of the instantaneous speed of rotation of the wheel at the moment of either release of the brake during braking, or application of the brake during acceleration. To this value is applied either a percentage reduction per unit of time during braking, or a percentage increment per unit of time during acceleration. It is appreciated that this calculation can be performed in many other ways without departing from the spirit or scope of the invention. The same is true of the calculation of the aforementioned memorized maximum period following the elapse of which the brake is applied automatically during braking and is released automatically during acceleration.

We claim:

1. A method of automatically actuating a wheel brake of a vehicle during both braking and acceleration of the vehicle to prevent the wheel from skidding, comprising the steps of:

sensing an instantaneous speed of rotation of the wheel;

calculating an instantaneous absolute speed variation of the wheel based upon said sensed instantaneous speed of rotation of the wheel;

automatically releasing the wheel brake during braking of the vehicle when said instantaneous absolute speed variation is greater than a predetermined maximum permissible value;

after an automatic release of the wheel brake during braking of the vehicle, automatically applying the wheel brake during braking of the vehicle exclusively upon occurrence of the first to occur of the following conditions (a) and (b):

(a) when said instantaneous speed of rotation has increased to a predetermined application value, and (b) once a first predetermined period has elapsed since said automatic release of the wheel brake, said first predetermined period being reckoned from said automatic release of the wheel brake and being calculated as a percentage increment of time to be added to the time period between a previous automatic release and application of the wheel brake during braking;

automatically applying the wheel brake during acceleration of the vehicle when said instantaneous absolute speed variation is greater than said predetermined maximum permissible value; and after an automatic application of the wheel brake during acceleration of the vehicle, automatically releasing the wheel brake during acceleration of the vehicle exclusively upon occurrence of the first to occur of the following conditions (c) and (d):

(c) when said instantaneous speed of rotation has decreased to a predetermined release value, and (d) once a second predetermined period has elapsed since said automatic application of the wheel brake, said second predetermined period being reckoned from said automatic application of the wheel brake and being calculated as a percentage increment of time to be added to the time period between a previous automatic application and release of the wheel brake during acceleration.

2. The method of claim 1, and further comprising the step of:

automatically releasing the wheel brake during braking of the vehicle when said instantaneous speed of rotation of the wheel approaches zero and the vehicle is still in motion.

3. The method of claim 1 in which:

said predetermined application value is a function of the instantaneous speed of rotation of the wheel that existed at the time of said automatic release of the wheel brake during braking of the vehicle; and said predetermined release value is a function of the instantaneous speed of rotation of the wheel that existed at the time of said automatic application of the wheel brake during acceleration of the vehicle.

4. The method of claim 1 in which:

said predetermined maximum permissible variation in the speed of rotation of the wheel is approximately identical with the maximum variation in the speed of rotation of the wheel which can be achieved during braking on an icy surface.

5. The method of claim 1 in which:

said predetermined application value is based upon the instantaneous speed of rotation of the wheel that existed at the time of said automatic release of the wheel brake during braking of the vehicle, to which is added a percentage reduction; and said predetermined release value is based upon the instantaneous speed of rotation of the wheel that existed at the time of said automatic application of the wheel brake during acceleration of the vehicle, to which is added a percentage increment.

6. A method of automatically actuating a wheel brake of a vehicle during braking of the vehicle to prevent the wheel from skidding, comprising the steps of:

sensing an instantaneous speed of rotation of the wheel;

calculating an instantaneous absolute speed variation of the wheel based upon said sensed instantaneous speed of rotation of the wheel;

automatically releasing the wheel brake during braking of the vehicle when said instantaneous absolute speed variation is greater than a predetermined maximum permissible value; and after an automatic release of the wheel brake during braking of the vehicle, automatically applying the wheel brake during braking of the vehicle exclusively upon occurrence of the first to occur of the following conditions (a) and (b):

(a) when said instantaneous speed of rotation has increased to a predetermined application value, and (b) once a predetermined period has elapsed since said automatic release of the wheel brake, said predetermined period being reckoned from said automatic release of the wheel brake and being calculated as a percentage increment of time to be added to the time period between a previous automatic release and application of the wheel brake during braking.

7. The method of claim 6, and further comprising the step of:

automatically releasing the wheel brake during braking of the vehicle when said instantaneous speed of rotation of the wheel approaches zero and the vehicle is still in motion.

8. The method of claim 6 in which:

said predetermined application value is a function of the instantaneous speed of rotation of the wheel that existed at the time of said automatic release of the wheel brake during braking of the vehicle.

9. The method of claim 6 in which:

said predetermined application value is based upon the instantaneous speed of rotation of the wheel that existed at the time of said automatic release of the wheel brake during braking of the vehicle, to which is added a percentage reduction.

10. A method of automatically actuating a wheel brake of a vehicle during acceleration of the vehicle to prevent the wheel from skidding, comprising the steps of:

sensing an instantaneous speed of rotation of the wheel;

calculating an instantaneous absolute speed variation of the wheel based upon said sensed instantaneous speed of rotation of the wheel;

automatically applying the wheel brake during acceleration of the vehicle when said instantaneous absolute speed variation is greater than a predetermined maximum permissible value; and after an automatic application of the wheel brake during acceleration of the vehicle, automatically releasing the wheel brake during acceleration of the vehicle exclusively upon occurrence of the first to occur of the following conditions (a) and (b):

(a) when said instantaneous speed of rotation has decreased to a predetermined release value, and (b) once a predetermined period has elapsed since said automatic application of the wheel brake, said predetermined period being reckoned from said automatic application of the wheel brake and being calculated as a percentage increment of time to be added to the time period between a previous automatic application and release of the wheel brake during acceleration;

said predetermined application value is a function of the instantaneous speed of rotation of the wheel that existed at the time of said automatic release of the wheel brake during braking of the vehicle.

11. The method of claim 10 in which:

said predetermined release value is a function of the instantaneous speed of rotation of the wheel that existed at the time of said automatic application of the wheel brake during acceleration of the vehicle.

12. The method of claim 10 in which:

said predetermined release value is based upon the instantaneous speed of rotation of the wheel that existed at the time of said automatic application of the wheel brake during acceleration of the vehicle, to which is added a percentage increment.

13. Apparatus for automatically actuating a wheel brake of a vehicle during both a braking condition and an acceleration condition of the vehicle to prevent the wheel from skidding, comprising:

sensing means for sensing an instantaneous speed of rotation of the wheel;

calculating means for calculating an instantaneous absolute speed variation of the wheel based upon said sensed instantaneous speed of rotation of the wheel;

processing means, responsive to said sensing means and said calculation means, for generating a brake release signal and a brake application signal;

said processing means, during braking condition of the vehicle, generating said brake release signal when said instantaneous absolute speed variation is greater than a predetermined maximum permissible value, and generating said brake application signal after generation of a brake release signal exclusively upon occurrence of the first to occur of the following conditions (a) and (b):

(a) when said instantaneous speed of rotation has increased to a predetermined application value, and (b) once a first predetermined period has elapsed since generation of said brake release signal, said first predetermined period being reckoned from generation of said brake release signal and being calculated as a percentage increment of time to be added to the time period between a previous brake release signal and brake application signal;

said processing means, during the acceleration condition of the vehicle, generating a brake application signal when said instantaneous absolute speed variation is greater than said predetermined maximum permissible value, and generating a brake release signal after generation of a brake application signal exclusively upon occurrence of the first to occur of the following conditions (c) and (d):

(c) when said instantaneous speed of rotation has decreased to a predetermined release value, and (d) once a second predetermined period has elapsed since generation of said brake application signal, said second predetermined period being reckoned from generation of said brake application signal and being calculated as a percentage increment of time to be added to the time period between a previous brake application signal and brake release signal;

means responsive to said brake application signal for applying the wheel brake; and means responsive to said brake release signal for releasing the wheel brake.

* * * * *